US011828836B1

(12) United States Patent
Dana et al.

(10) Patent No.: US 11,828,836 B1
(45) Date of Patent: Nov. 28, 2023

(54) RADAR DETECTION AND DISCRIMINATION OF QUADCOPTERS USING MEASURED DOPPLER SIGNATURES SYSTEM AND METHOD

(71) Applicant: Rockwell Collins, Inc., Cedar Rapids, IA (US)

(72) Inventors: Roger A. Dana, Marion, IA (US); Jean-Phillippe Wasselin, Toulouse (FR); John W. Borghese, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 394 days.

(21) Appl. No.: 16/556,560

(22) Filed: Aug. 30, 2019

(51) Int. Cl.
| G01S 13/50 | (2006.01) |
| G01S 13/89 | (2006.01) |
| G01S 13/58 | (2006.01) |
| B64C 39/02 | (2023.01) |
| B64U 70/00 | (2023.01) |

(52) U.S. Cl.
CPC .......... *G01S 13/505* (2013.01); *B64C 39/024* (2013.01); *G01S 13/581* (2013.01); *G01S 13/89* (2013.01); *B64U 70/00* (2023.01)

(58) Field of Classification Search
CPC ...... G01S 13/505; G01S 13/581; G01S 13/89; B64C 39/024; B64C 2201/08
See application file for complete search history.

(56) References Cited

U.S. PATENT DOCUMENTS

| 5,150,099 A * | 9/1992 | Lienau | G01S 13/56 340/552 |
| 5,508,706 A * | 4/1996 | Tsou | G01S 7/032 342/192 |
| 7,295,149 B1 * | 11/2007 | Wolf | F41H 11/02 342/90 |
| 8,242,952 B1 * | 8/2012 | Barr | G01S 7/412 342/55 |
| 9,229,102 B1 * | 1/2016 | Wright | G01S 13/885 |
| 2005/0275582 A1 * | 12/2005 | Mohan | G01S 13/003 342/27 |

(Continued)

FOREIGN PATENT DOCUMENTS

| CN | 108469607 A | 8/2018 |
| CN | 108957443 A | 12/2018 |

(Continued)

*Primary Examiner* — Peter M Bythrow
*Assistant Examiner* — Nazra Nur Waheed
(74) *Attorney, Agent, or Firm* — Suiter Swantz pc llo

(57) ABSTRACT

A system and method for detection and identification of an Unmanned Aircraft Systems (UAS) employs a radar system to detect and identify the UAS based on the rich Doppler spectrum generated by one or more rotors and associated motors onboard the UAS. UAS have a low radar cross sections (RCS), relatively low speed, and possess a unique Doppler signature providing data for the system to discriminate once the system detects the quadcopter UAS. The system and method functions as a traditional radar, yet analyzes the micro-Doppler signature, including the RCS and radial speed, to detect and identify the UAS. Based on the signature analysis, the system and method are able to distinguish one model from other types of UAS.

15 Claims, 7 Drawing Sheets

(56) References Cited

U.S. PATENT DOCUMENTS

| | | | |
|---|---|---|---|
| 2012/0254208 A1* | 10/2012 | Duvoisin, III | G01S 7/412 |
| | | | 707/758 |
| 2017/0192089 A1* | 7/2017 | Parker | H04K 3/45 |
| 2017/0234966 A1* | 8/2017 | Naguib | G01S 5/22 |
| | | | 367/117 |
| 2018/0164406 A1* | 6/2018 | Culkin | G01S 13/522 |
| 2018/0246205 A1* | 8/2018 | Surace | G01S 13/953 |
| 2019/0137605 A1 | 5/2019 | Harman | |

FOREIGN PATENT DOCUMENTS

| | | | | |
|---|---|---|---|---|
| EP | 3465660 A1 | 4/2019 | | |
| GB | 2562829 A * | 11/2018 | | B64F 5/60 |
| WO | 2019091867 A1 | 5/2019 | | |
| WO | WO-2019091867 A1 * | 5/2019 | | G01S 13/32 |

\* cited by examiner

RADAR DETECTION AND DISCRIMINATION OF QUADCOPTERS USING MEASURED DOPPLER SIGNATURES SYSTEM AND METHOD

BACKGROUND

Unmanned Aircraft Systems (UAS) may pose a threat to manned and unmanned aerial traffic. Due to its small size, a UAS may be difficult to visually acquire and at sufficient speed, nearly impossible to see and avoid. Although small, a UAS may possess sufficient mass to damage an aircraft including a windscreen, a control surface, and most importantly, an engine.

UAS may also threaten ground-based installations such as prisons, power plants, military bases, and dams by UAS delivering contraband inside a perimeter, using video for nefarious activities, and possible weapons employment.

Many UAS employ one or more rotors to produce required lift while a subset of UAS may employ a quad rotor system lending to the term "quadcopters" as a label for those UAS with four rotors. Some UAS may employ a greater number of rotors to produce greater lift enabling a larger payload.

Perimeter Surveillance Radars (PSRs) may be designed to detect motion e.g., walking humans, approaching a perimeter of a protected facility while Aircraft Weather Radars (WxR) may be designed to display moisture, storm systems, turbulence, or other regions that pilots may wish to avoid. Both of these systems maintain a waveform unique to the designed threat. PSR waveforms may be configured to detect a moving human while WxR waveforms may be configured to detect water. Both of these systems may be employed in areas threatened by low-cost, off-the-shelf quadcopters.

Traditionally, neither of these systems may adequately detect UAS activity in areas which may threaten the hardware and people the radars were designed to protect. Therefore, a need remains for a system and method which may overcome these limitations and provide a novel solution to detection and identification of a UAS by a currently deployed radar system offering an additional level of protection to the locations and machines on which the radars are employed.

SUMMARY

In one aspect, embodiments of the inventive concepts disclosed herein are directed to a system for detection and identification of an Unmanned Aerial System (UAS). The system may comprise a coherent radar system which in turn may comprise an antenna configured to send and receive a radio frequency (RF) signal via a frequency and a waveform and an analog to digital (AD) converter operatively coupled with the antenna. For control, the system may employ a controller operatively coupled with the AD converter and a user interface operatively coupled with the controller. A tangible, non-transitory memory may be configured to communicate with the controller, the tangible, non-transitory memory having instructions stored therein that, in response to execution by the controller, cause the controller to perform the steps to detect and identify the UAS.

The controller may generate and send an RF signal to the AD converter, command the antenna to send the RF signal and receive a micro-Doppler echo of the RF signal. The controller may receive a digital form of the micro-Doppler echo from the AD converter. The controller may extract from the digital form of the micro-Doppler echo a plurality of UAS parameters including 1) a micro-Doppler spectra of a UAS, 2) a detection of the UAS, 3) a radar cross section (RCS) of the UAS, and 4) a radial speed of the UAS.

The controller may compare the micro-Doppler spectra, the RCS and the radial speed of the UAS to a signature stored within the non-transitory memory to identify a type of UAS based on the comparison and send a detection indication and an identification indication to the user interface.

A further embodiment of the inventive concepts disclosed herein may include a method for detection and identification of an Unmanned Aerial System (UAS). The method may comprise generating and sending an RF signal then receiving a micro-Doppler echo of the RF signal. The method may include converting the micro-Doppler echo of the RF signal to a digital form of the micro-Doppler echo and extracting from the digital form of the micro-Doppler echo 1) a micro-Doppler spectra of a UAS, 2) a detection of the UAS, 3) a radar cross section (RCS) of the UAS, and 4) a radial speed of the UAS.

The method may include comparing the micro-Doppler spectra, the RCS and the radial speed of the UAS to a signature stored within a memory and identifying a type of UAS based on the comparison. The method may also include sending a detection indication and an identification indication to a user interface.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
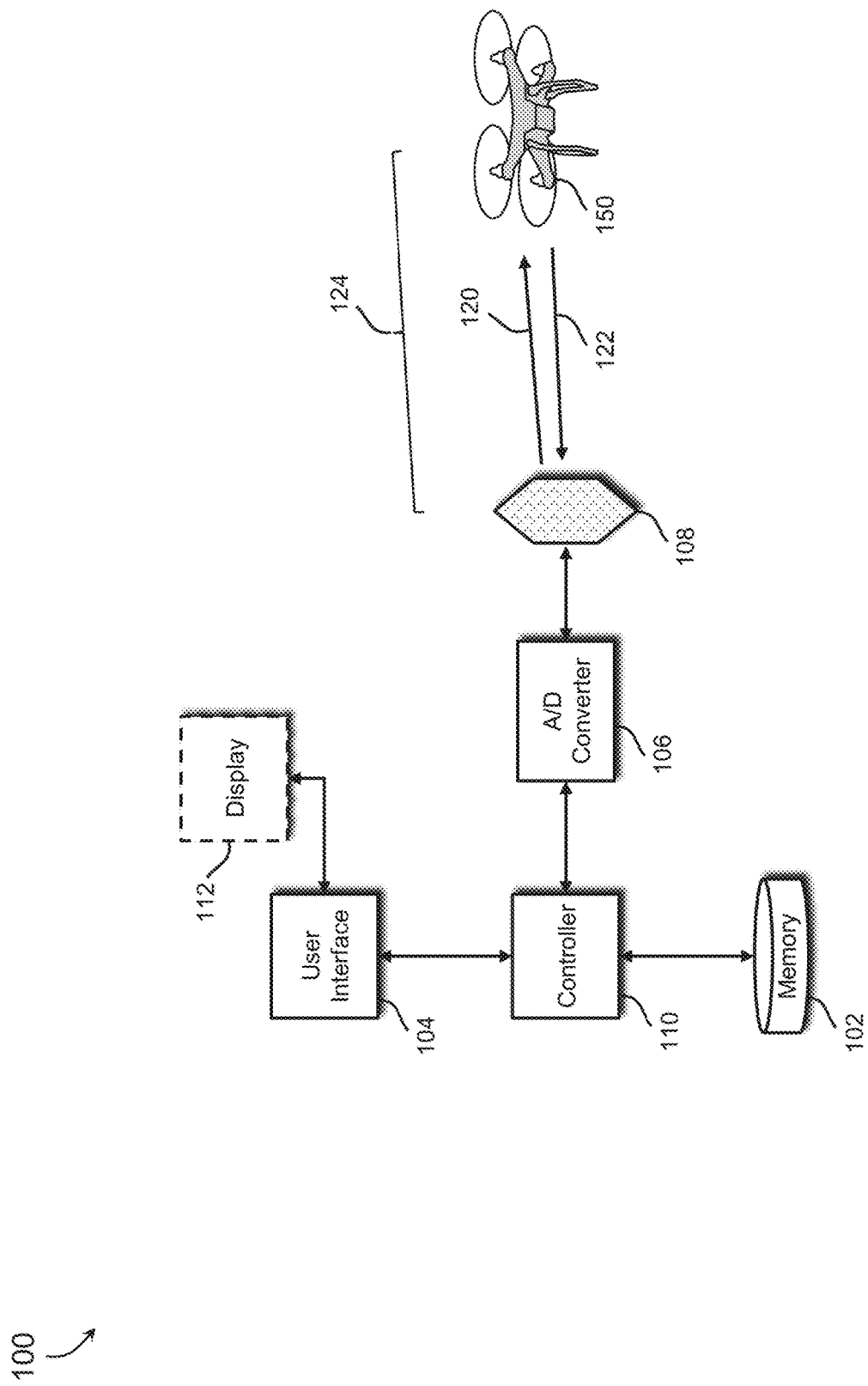
FIG. 1 is a diagram of a system for detection and identification of an UAS in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for detection and identification of an Unmanned Aircraft Systems (UAS) employs a radar system to detect and identify the UAS based on the rich Doppler spectrum generated by one or more rotors and associated motors onboard the UAS. UAS have a low radar cross sections (RCS), relatively low speed, and possess a unique Doppler signature providing data for the system to discriminate once the system detects the quadcopter UAS. The system and method functions as a traditional radar, yet analyzes the micro-Doppler signature, including the RCS and radial speed, to detect and identify the UAS. Based on the signature analysis, the system and method are able to distinguish one model from other types of UAS

| REFERENCE CHART | |
|---|---|
| 100 | System for Detecting and Identifying a UAS |
| 102 | Memory |
| 104 | User Interface (UI) |
| 106 | A/D Converter |
| 108 | Antenna |
| 110 | Controller |
| 112 | Display |
| 120 | Transmit Signal |
| 122 | Return Signal |
| 124 | Range (R) |
| 150 | UAS |
| 200 | Doppler S/N vs Range |
| 210 | PSR Low RCS |
| 212 | PSR High RCS |
| 220 | WXR Low RCS |
| 222 | WXR High RCS |
| 230 | Low RCS UAS Range |
| 232 | High RCS UAS Range |
| 234 | Difference in RCS |
| 300 | Logic Flow |
| 302 | Send RF Signal |
| 304 | Receive Analog |
| 306 | Convert to Digital |
| 308 | Extract Parameters |
| 310 | UAS Parameters within Memory? |
| 312 | Store New Parameters |
| 314 | ID the UAS |
| 316 | Send ID to U/I |
| 318 | Display on User Display |
| 320 | Configure for Processor |
| 400 | UAS A Doppler Signature |
| 410 | UAS A Idle |
| 412 | UAS A Power Up |
| 414 | UAS A Max Power |
| 416 | UAS A Power Down |
| 420 | UAS A End |
| 450 | Zero Doppler Return |
| 500 | UAS B Doppler Signature |
| 508 | UAS B Off |
| 512 | UAS B Power Up |
| 514 | UAS B Max Power |
| 516 | UAS B Power Down |
| 520 | UAS B End |
| 600 | UAS C Doppler Signature |
| 608 | UAS C Off |
| 612 | UAS C Power Up |
| 614 | UAS C Max Power |
| 616 | UAS C Power Down |
| 620 | UAS C End |
| 700 | Method Flow |
| 702 | Generate and Send Signal |
| 704 | Receive Micro-Doppler Echo |
| 706 | Convert to Digital |
| 708 | Extract Parameters |
| 710 | Compare to Stored Parameters |
| 712 | ID the UAS |
| 714 | Send to U/I |

FIG. 1 System

Referring now to FIG. 1, a diagram of a system for detection and identification of an UAS in accordance with an embodiment of the inventive concepts disclosed herein is shown. Generally, the system for detecting and identifying a UAS 100 may include employment of a coherent radar system such as a Perimeter Surveillance Radar (PSR) and an Aircraft Weather Radars (WxR). These coherent radar systems may be specifically configured to perform in accordance with the system for detecting and identifying a UAS 100.

Such a coherent radar system may include a controller 110 configured to control operations of the radar system. The controller 110 may include one or more processors configured to carry out assigned tasks the controller 110 may command. A memory 102 may operatively couple with the controller 110 and store commands as well as data available to the controller 110. The memory 102 may include a tangible, non-transitory memory configured to communicate with the controller, the tangible, non-transitory memory having instructions stored therein that, in response to execution by the controller, cause the controller to carry out the steps of the system for detecting and identifying a UAS 100.

A user interface (UI) 104 may also operatively couple with the controller 110 and function to receive commands from a user as well as from additional processors and systems. Should a human user employ the system for detecting and identifying a UAS 100, a display 112 may function to present a display to the user as well as receive commands from the user for operation of the system for detecting and identifying a UAS 100.

Should the system for detecting and identifying a UAS 100 be sited on a host UAS or unmanned ground-based system, the UI 104 may configure the output for use by a processor configured for countering a threat UAS. For example, a PSR protection system for a prison may include an unmanned UAS threat countermeasure system. The system for detecting and identifying a UAS 100 may aid security officers in countering such a threat UAS.

An antenna 108, operatively coupled with the controller 110 via an analog to digital (A/D) converter 106, may function to send and receive a radio frequency (RF) signal via a frequency and a waveform based on controller 110 commands. Contemplated herein, a single as well as a dual antenna system may function within the scope of the inventive concepts disclosed herein. A dual antenna may be employed in a Frequency Modulated Continuous Wave (FMCW) radar system (e.g., PSR), one for transmit and the other for receive as isolation of the transmit signal may enable receiver detection of, for example, a weak signal. The controller 110 may command a transmit signal 120 be sent via the antenna 108. The transmit signal 120 may then be reflected from one or more UAS 150 at a range (R) 124. Once reflected, the return signal 122 may be received by the antenna 108 (single or dual), converted to digital by the A/D converter 106 and received by the controller 110 for signal processing and analysis.

In analysis, the controller 110 may function to measure a Doppler spectrum by collecting Doppler shift data variable in time from pulse-to-pulse of the radar. The controller may determine the Doppler spectrum via a Fourier transform of multiple pulses. The controller 110 may possess the coherency necessary to control the phase of the transmitted signal so multiple pulses may be combined indicating a coherent phase relationship from one pulse to the next at a given range. The controller 110 may perform the steps to Fourier transform the individual pulses at the specific range 124 into the Doppler domain.

Radar Equation

In one embodiment of the inventive concepts disclosed herein, the controller 110 may employ a derivation of a radar range equation including the following:

$$P_T = \text{Isotropic } Tx \text{ power} \tag{1}$$

$$P_T G = \text{power transmitted toward target} \tag{2}$$

$$\frac{P_T G}{4\pi R^2} = \text{power/area at target} \tag{3}$$

$$\frac{P_T G}{4\pi R^2}\sigma = \text{power reflected toward radar} \tag{4}$$

$$\frac{P_T G}{4\pi R^2}\frac{\sigma}{4\pi r^2} = \text{power/area incident on antenna} \tag{5}$$

$$\frac{P_T G}{4\pi R^2}\frac{\sigma}{4\pi r^2}A_e = \text{recieved signal power} \tag{6}$$

$$A_e = \frac{\lambda^2 G}{4\pi}\left(\frac{Ae}{\lambda^2} = \frac{G}{4\pi}\right) \tag{7}$$

$$S = \frac{P_T G^2 \lambda^2 \sigma}{(4\pi)^3 R^4} \tag{8}$$

$$\frac{S}{N} = \frac{S}{N_0 B} = \frac{(G^2 P_T \tau)\lambda^2 \sigma}{(4\pi)^3 L R^4 k T_s} \tag{9}$$

Wherein:

$P_T$=isotropic transmitter (radiated) power (w)(kw) e.g., the power amplifier within the transmitter may possess an output power either in a peak power or average power output depending on system configuration;

G=Gain of the antenna toward a target;

$P_T G$=effective isotropic radiated power or power radiated toward the target;

R=slant range to the target, range from the transmitter to the target;

σ=radar cross section (RCS) (area e.g., m$^2$) (reported values of RCS in dBsm);

$A_e$=Radar antenna effective area;

S=Received signal power from the target with cross section of a;

k=Boltzmann's constant=1.38×10$^{-23}$ W-sec/deg-K (or equivalently energy in Joules per deg-K);

$T_s$=system noise temperature≥290K;

N=$N_0$B=noise power within the bandwidth (B);

$N_0$=k $T_s$=noise power spectral density;

B≈1/τ=receiver bandwidth (Hz);

λ=wavelength;

τ=pulsewidth (sec) e.g., a chirp duration in PSR and length of pulse in the WxR; and L=losses from myriad sources e.g., cable, atmospheric, etc.

In the derivation of the radar range equation, the equation (1) may begin with the $P_T$ of the radar transmitter. Equation (2) may indicate a power spherically transmitted from the radar antenna. Equation (3) may indicate that portion of the spherical power transmission at the range R. Multiplied by σ (a monostatic value that reflects the energy scattered in the direction of the radar), the equation (4) may indicate that portion of the power incident on the target. At the same range R, equation (5) may indicate the power incident on the antenna. Limited by the area of the antenna $A_e$, the power received by the antenna may be indicated in equation (6).

Area of the antenna $A_e$ may be written in terms of its gain (G) as equation (7). Equation (8) may indicate the received signal power (S) from the target with cross section of σ through the antenna of area $A_e$. Following to equation (9) including a noise of the antenna of $N_0B$, the controller 110 may determine the signal-to-noise ratio of the received signal.

FIG. 2 Ranges

Figure 2:
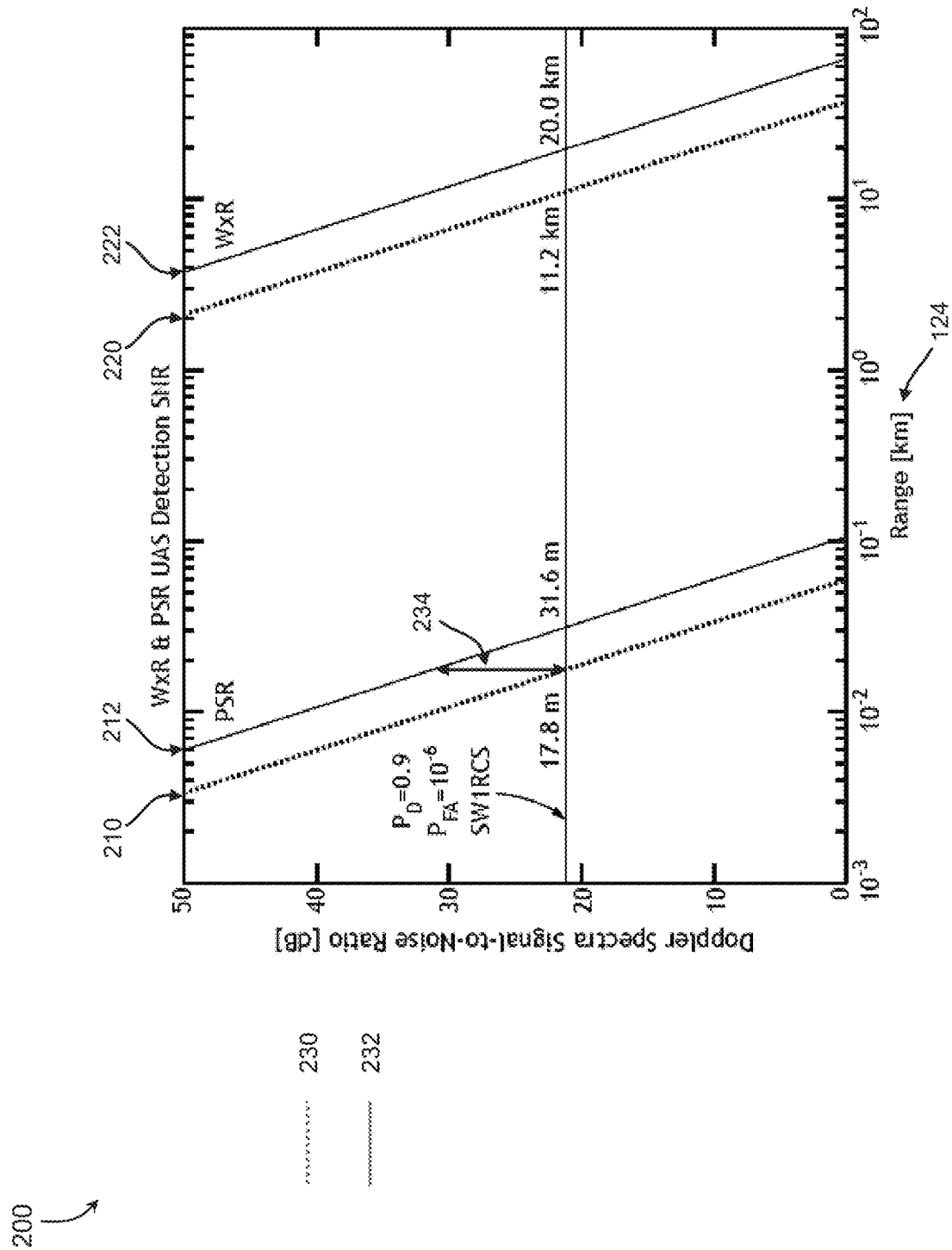
FIG. 2 is a graph of a Doppler spectra signal to noise versus range in accordance with an embodiment of the inventive concepts disclosed herein.

Referring now to FIG. 2, a graph of a Doppler spectra signal to noise versus range in accordance with an embodiment of the inventive concepts disclosed herein is shown. An exemplary detection range graph 200 for each of a PSR and a WxR may indicate probable detection ranges associated with each radar system. After the controller 110 may transform the signal from the time domain to the Doppler frequency domain via a Fourier transform of the received voltage samples, FIG. 2 may be an example of UAS detection ranges.

An X axis of the graph 200 may include a range scale from $10^{-3}$ to $10^2$ km while the Y axis may indicate an exemplary Doppler signal to noise ratio of the spectral measurements (dB). A Low RCS UAS Range line 230 may be proximal with a High RCS UAS Range line 232 for each contemplated radar system WxR PSR. An uncertainty 234 from differing RCS may provide the basis for the low and high range lines 230 232.

Exemplary coherent radar systems usable by the system for detecting and identifying a UAS 100 may include those PSR systems and WxR systems with the following exemplary parameters.

WxR Parameters

In one embodiment of the inventive concepts disclosed herein, exemplary WxR (Pulsed-Doppler) parameters may include:
  i. $P_T$=18.75 dBW;
  ii. G=34 dB;
  iii. $N_{CI}$=256 (coherent pulses) (e.g., coherent integration);
  iv. $N_F$=3 dB (noise figure);
  v. τ=25 µsec;
  vi. f=9.4 GHz.

PSR Parameters

Similarly, an exemplary set of PSR (FMCW) (Frequency Modulated Continuous Wave) parameters may include:
  i. $P_T$=12.2 dBm;
  ii. $G_R$=10.1 dBi;
  iii. $N_{CI}$=256 (coherent pulses);
  iv. $N_F$=7.8 dB (noise figure);
  v. BW=1.95 MHZ; and
  vi. f=5.8 GHz.

Proportional to power $P_T$, each of the radar types (PSR, WxR) may provide differing ranges 124 at which the controller 110 may detect a UAS 150. At a greater power $P_T$ of an exemplary 18.75 dBW, the WxR may detect the UAS at a greater range.

RCS

Detection range may also be proportional to RCS where each radar type may detect a UAS with the high RCS 232 at a longer range than the range at which the radar may detect the low RCS UAS 230 target. A plurality of factors may affect the RCS of a UAS including body size, body type (e.g., metallic or plastic), rotor size and composition, etc.

In one embodiment of the inventive concepts disclosed herein, the controller 110 may use an exemplary Swerling 1 radar cross section (SW1 RCS) model to normalize the RCS fluctuations in sometimes incoherent and complex targets such as the UAS 150. As the rotor blades of the UAS 150 may rotate causing a fluctuation in RCS, the controller 110 may employ the SW1 model to positively detect the UAS 110 despite the complexity of the UAS Doppler return signal.

The Swerling models may be employed here to describe the statistical properties of the RCS of objects with a complex scattering surface. The RCS of a reflecting object based on a chi-square probability density function with specific degrees of freedom. A Swerling I target may include a target whose magnitude of the backscattered signal is relatively constant during the dwell time. It varies according to a chi-square probability density function with two degrees of freedom. The radar cross-section may be constant from pulse-to-pulse, but may also vary independently from scan to scan.

A difference 234 of approximately 10 dB between the low 230 and high 232 RCS targets may equate to differing sizes and types of threatening UAS 150. Contemplated herein, most quadcopter UAS 150 may fall between the low 230 and high 232 lines to be detectable by the system for detecting and identifying a UAS 100.

To achieve a Probability of False Alarm (PFA) of approximately $10^{-6}$ and a Probability of Detection (Po) of approximately 0.9, the controller 110 may command a signal to noise ratio of 21 dB to maintain a low RCS UAS 230 range/high RCS UAS 232 range by a PSR of an exemplary 17.8 m 210 and 31.6 m 212 respectively and detectable by a WxR at an exemplary 11.2 km 220 and 20.0 km 222 respectively.

In one embodiment of the inventive concepts disclosed herein, the system for detecting and identifying a UAS 100 may be specifically configured to function on an existing WxR system on an aircraft as well as a surface based PSR system. The system for detecting and identifying a UAS 100 may include a modification of a portion of a memory 102 within the WxR and PSR to configure each radar system for receiving the RF return signal 122, and extracting a micro-Doppler spectra of a UAS 150 and comparing the extracted a micro-Doppler spectra to a signature stored within the memory 102.

FIG. 3 Logic

Figure 3:
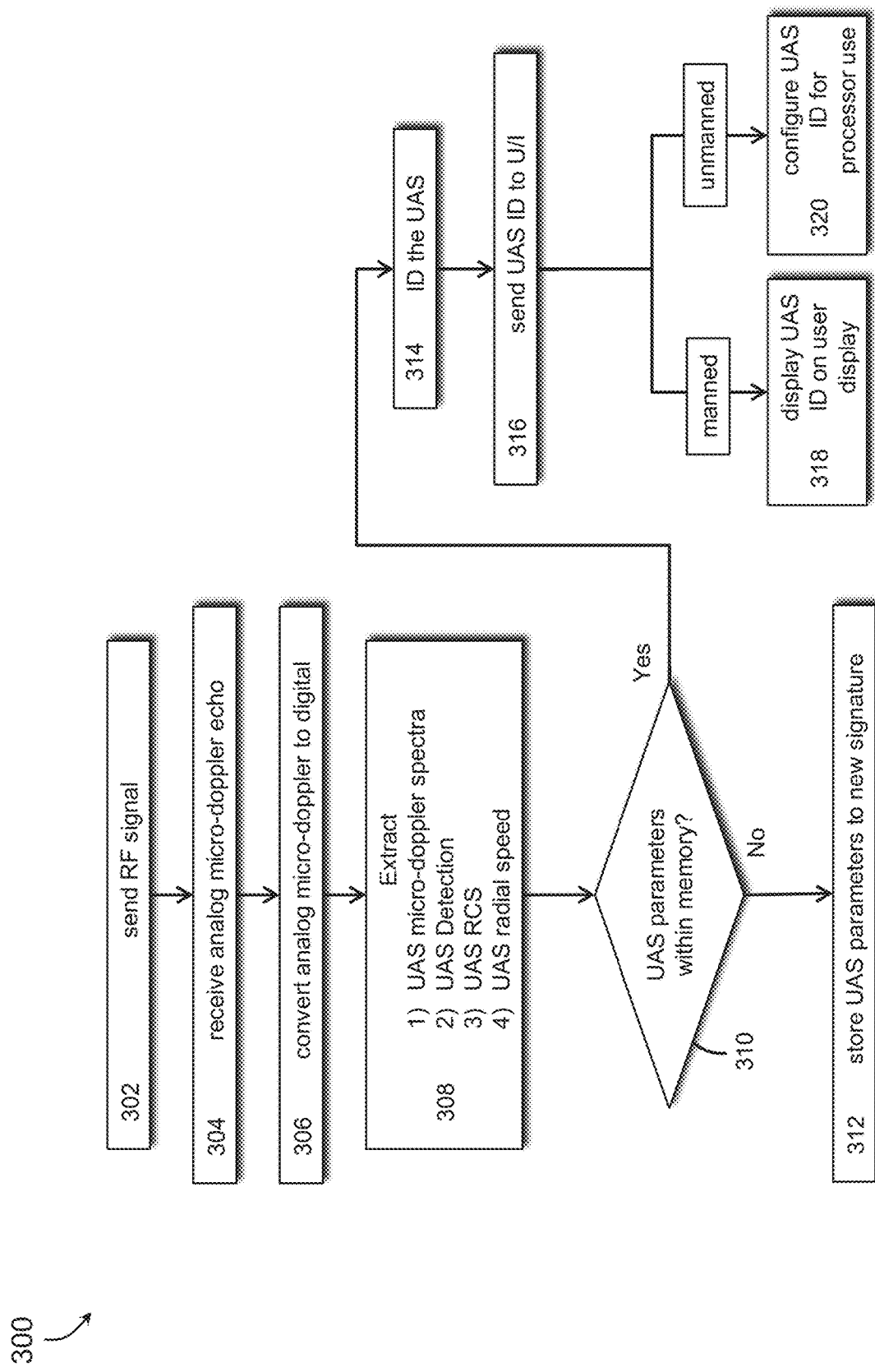
FIG. 3 is a diagram of an exemplary logic flow of an embodiment of the inventive concepts disclosed herein.

Referring now to FIG. 3, a diagram of an exemplary logic flow of an embodiment of the inventive concepts disclosed herein is shown. The logic flow 300 may offer exemplary steps to perform functions of the system for detecting and identifying a UAS 100 in accordance with one embodiment of the inventive concepts disclosed herein.

In function, the controller 110 may be specifically configured to generate and send an RF signal to the AD converter at a step 302, command the antenna to send the RF signal and receive a micro-Doppler echo of the RF signal at a step 304. The controller 110 may command the A/D converter 106 to convert the return analog micro-Doppler echo 122 from analog to digital at a step 306. The controller 110 may then receive a digital form of the micro-Doppler echo from the AD converter.

In one embodiment of the inventive concepts disclosed herein, the frequency of the RF signal may include a weather radar frequency of approximately 9.4 GHz and a perimeter surveillance radar frequency of approximately 5.8 GHz. Also, the RF signal waveform may include a pulse-Doppler waveform and a frequency modulated continuous wave waveform.

The controller 110 may, at a step 308, extract from the digital form of the micro-Doppler echo at least one of: 1) a micro-Doppler spectra of at least one UAS, 2) a detection of the at least one UAS, 3) a radar cross section (RCS) of the at least one UAS, and 4) a radial speed of the at least one UAS. The detection indication may include details such as a range and an altitude of the UAS 150. In one embodiment of the inventive concepts disclosed herein, the controller 110 may employ a Fourier transform analysis of a plurality of samples of the digital form of the micro-Doppler echo.

The non-transitory memory 102 may include a plurality of signatures representative of an associated plurality of UAS models to enable the system for detecting and identifying a UAS 100 to identify the exact model of UAS 150. The controller 110 may query, at a step 310, with a comparison of each of UAS parameters including the micro-Doppler spectra, the RCS and the radial speed of the at least one UAS to a signature stored within the non-transitory memory 102. Should the comparison result in a non-match and a result of query 310 be negative, the logic may pass to a step 312 with storing the unidentified UAS parameters to a newly detected signature definition within the memory 102.

Should the result of query 310 be positive, the controller 110 may identify a type of UAS based on the comparison at a step 314, and send, at a step 316, a detection indication and an identification indication to the user interface. Should the system for detecting and identifying a UAS 100 be manned, the controller 110 may display the UAS ID on a user display viewable by a user at a step 318. However, if unmanned, the controller 110 may configure the UAS ID for further use by an additional system or processor at a step 320. One such processor may include a processor configured for maneuvering a UAS on which the system for detecting and identifying a UAS 100 may be installed.

Figure 4:
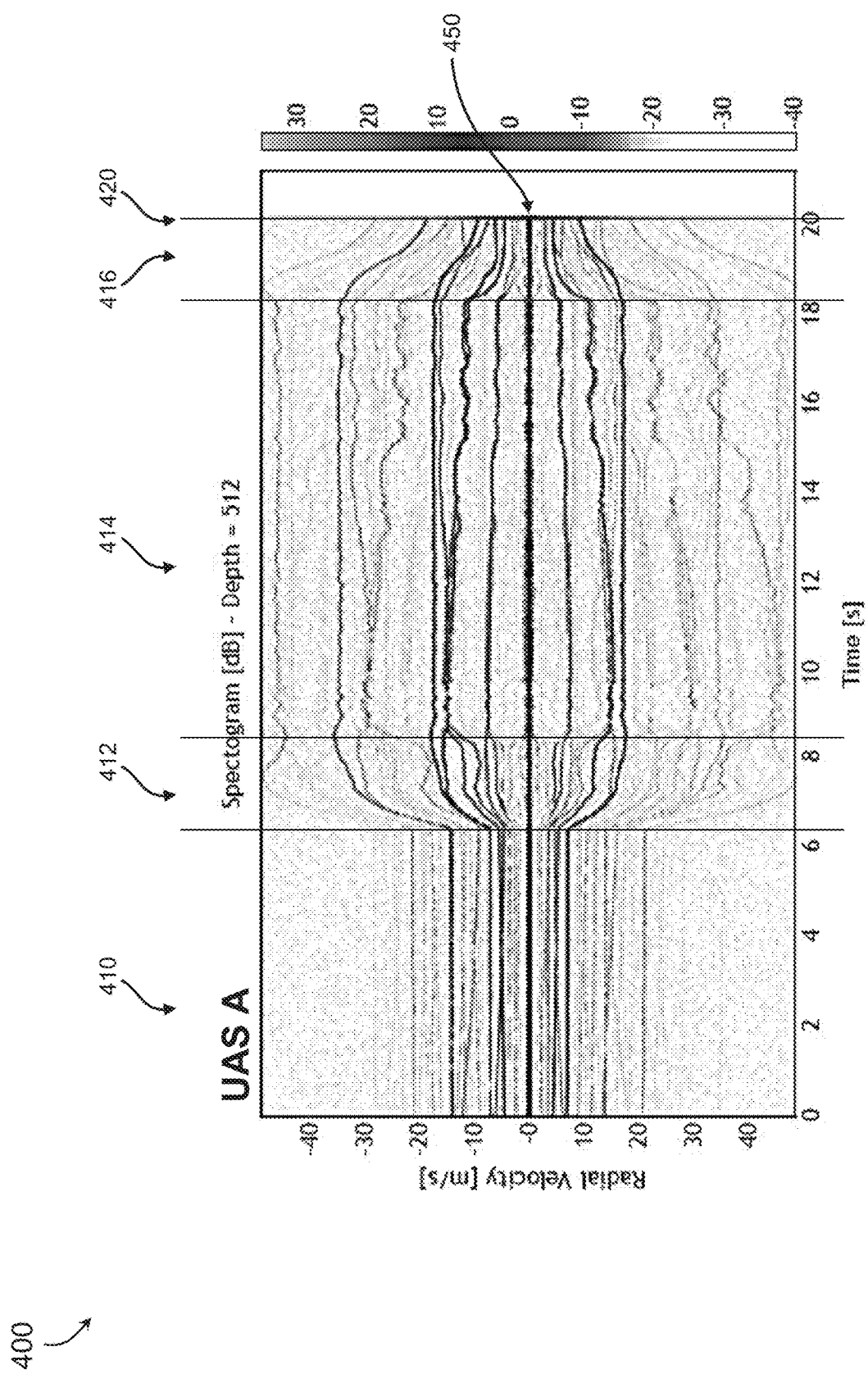
FIG. 4 is a diagram of a Doppler signature of an exemplary UAS A exemplary of one embodiment of the inventive concepts disclosed herein.
Figure 5:
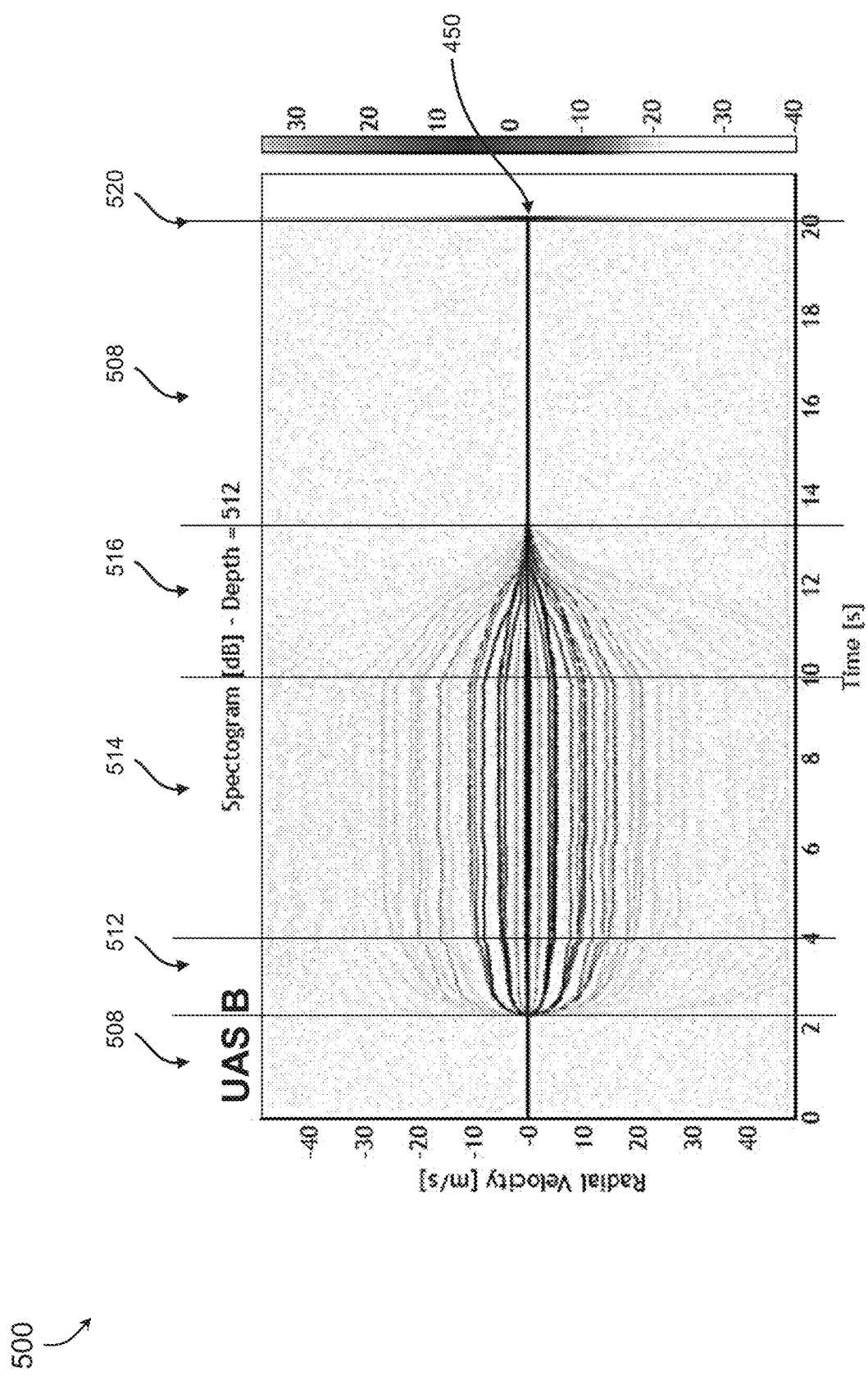
FIG. 5 is a diagram of a Doppler signature of an exemplary UAS B in accordance with one embodiment of the inventive concepts disclosed herein.
Figure 6:
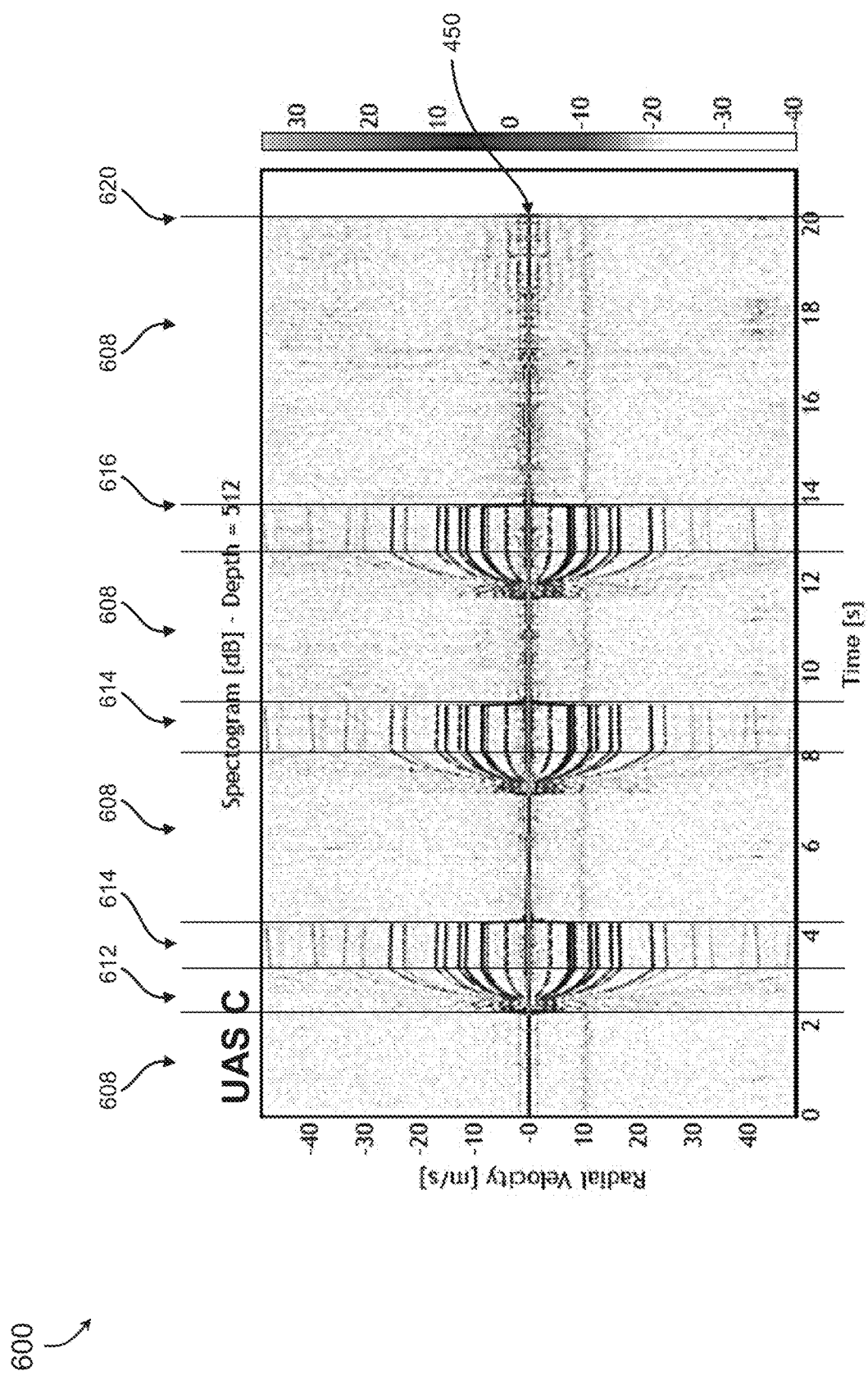
FIG. 6 is a diagram of a Doppler signature of an exemplary UAS C in accordance with one embodiment of the inventive concepts disclosed herein.

The following FIGS. 4-6 represent micro-Doppler spectra of three exemplary UAS 150. The controller 110 may use these micro-Doppler spectra as one portion in defining the signature of a specific UAS 150. Each specific UAS 150 may increase in RCS as the FIGs. increase with FIG. 4 the smallest RCS and FIG. 6 the largest RCS.

FIG. 4 UAS "A"

Referring now to FIG. 4, a diagram of a Doppler signature of an exemplary UAS A exemplary of one embodiment of the inventive concepts disclosed herein is shown. A micro-Doppler spectra of UAS A 400 may indicate how rich the micro-Doppler spectra may display as the radar may sense the UAS 150. A center line may indicate a zero Doppler 450 return while each plot above and below the zero Doppler 450 may indicate a strong Doppler return from the UAS 150.

Generally, quadcopter UAS may possess a rich and unique micro-Doppler signature, with spread and lines, that provide a means of discrimination. A typical quadcopter UAS may have a low radar cross sections (RCS), typically between −10 and −20 dBsm (decibels relative to a square meter), making them difficult to detect unless nearby. A quadcopter UAS may also have a low airspeed, as determined by the body return at the center of the spectra, compared to other types of airplane-like UAVs (e.g., a MQ-9 Reaper, RQ-7 Shadow).

The controller 110 may use all three qualities (Doppler spread and lines, RCS, and body airspeed) to define the signature of the specific UAS 150. The controller 110 may identify and detect the UAS 150, store a newly found signature if one does not exist in the memory 102, discriminate between UAS models, and distinguish from other types of UAVs. The signature may include the micro-Doppler spectra, a pattern of radial velocity over time, an RCS, and the radial speed.

The controller 110 may distinguish the micro-Doppler spectra using each of a rotor signature and a motor signature as each may deliver a specific micro-Doppler spectra discernable by the system for detecting and identifying a UAS 100.

Detection

For detection, the system for detecting and identifying a UAS 100 may receive the specific micro-Doppler spectra and determine a change in the spectra over time. The presence of the change may indicate a positive detection of the UAS 150.

FIG. 4 may indicate a UAS A idle 410 where a rotor is spinning yet the RPM may not be great enough for UAS flight. At approximately 6.5 seconds into the sample, a UAS A power up 412 may be indicated by a sharp increase and decrease in the Doppler return. At approximately 8.5 seconds, a UAS A max power 414 may be indicated due to the constant slope near zero. At approximately 18.4 seconds, a UAS A power down 416 may be indicated by the curves returning to the idle position. A UAS A end 420 may be indicated at approximately 20 seconds.

Identification

The controller 110 may be configured to sense this change in each of the micro-Doppler spectra as one portion of the overall signature of the UAS 150. Coupled with the radial speed and RCS of the UAS 150, the controller 110 may possess each element of the signature to positively ID the UAS 150.

FIG. 5 UAS "B"

Referring now to FIG. 5, a diagram of a Doppler signature of an exemplary UAS B in accordance with one embodiment of the inventive concepts disclosed herein is shown. The micro-Doppler spectra of UAS B 400 may indicate a spectrum dissimilar to that of the UAS A. Here, a UAS B Off 508 curve may indicate near zero Doppler spectra. A UAS B Power Up 512 may indicate a gradual increase in rotor speed and motor speed. A UAS B Max Power 514 curve may maintain a similar near zero slope while a UAS B Power Down 516 may me more gradual than the power up 512. As before, the end of the sample

FIG. 6 UAS "C"

Referring now to FIG. 6, a diagram of a Doppler signature of an exemplary UAS C in accordance with one embodiment of the inventive concepts disclosed herein is shown. A larger UAS C curve 600 may indicate three separate cycles showing a detail the system for detecting and identifying a UAS 100 may use in discrimination from other types of UAS 150. UAS C may be a larger UAS capable of carrying a payload. Thus, UAS C may maintain, for example, a larger rotor diameter and larger body size.

A UAS C off 608 curve may be zero as found in the previous curves. However, a UAS C power up 612 may indicate a particular signature which the controller 110 may use for an ID of the UAS C. During power up 612, a distinct (and nearly identical between cycles) hesitation in the micro-Doppler spectra may indicate a specific motor design and leading to a specific identification of the UAS C. Similarly, A UAS C max power 614 may be followed by a distinct UAS C power down 616 being nearly immediate. A UAS C end 620 may occur, similar to the other curves, at 20 seconds.

FIG. 7 Method

Figure 7:
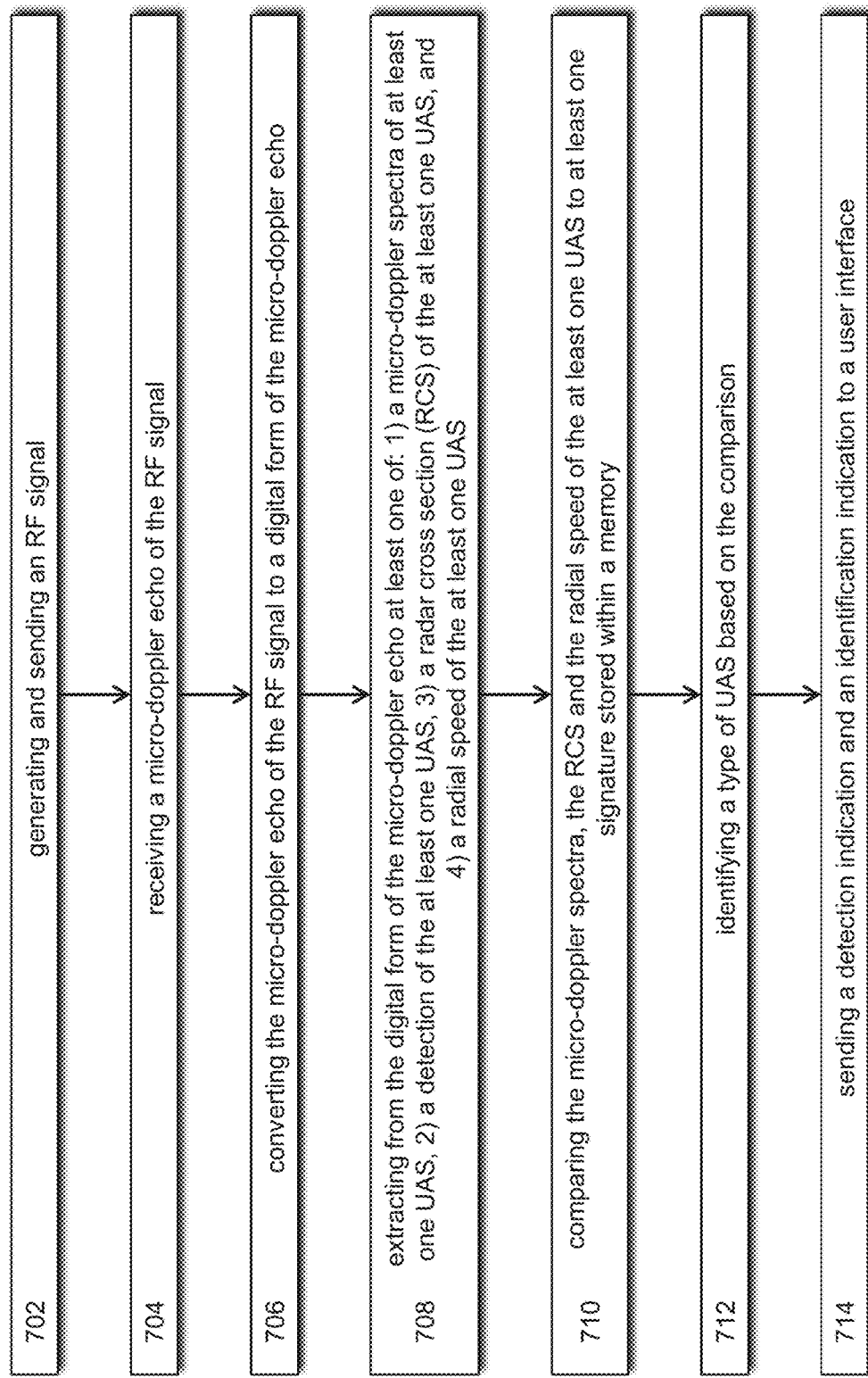
FIG. 7 a diagram of a method flow associated with one embodiment of the inventive concepts disclosed herein.

Referring now to FIG. 7, a diagram of a method flow associated with one embodiment of the inventive concepts disclosed herein is shown. A step 702 may include generating and sending an RF signal and a step 704 may include receiving a micro-Doppler echo of the RF signal. A step 706 may include converting the micro-Doppler echo of the RF signal to a digital form of the micro-Doppler echo while a step 708 may include extracting from the digital form of the micro-Doppler echo at least one of: 1) a micro-Doppler spectra of at least one UAS, 2) a detection of the at least one UAS, 3) an RCS of the at least one UAS, and 4) a radial speed of the at least one UAS.

A step 710 may include comparing the micro-Doppler spectra, the RCS and the radial speed of the at least one UAS to at least one signature stored within a memory, a step 712 may include identifying a type of UAS based on the comparison, and a step 714 may include sending a detection indication and an identification indication to a user interface.

CONCLUSION

As will be appreciated from the above description, embodiments of the inventive concepts disclosed herein may provide a novel solution to detection and identification of a UAS by a currently deployed radar system offering an additional level of protection to the locations and machines on which the radars are employed.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for detection and identification of an Unmanned Aerial System (UAS), comprising:
a coherent radar system comprising:
at least one antenna configured to send and receive a radio frequency (RF) signal via a frequency and a waveform;
an analog to digital (AD) converter operatively coupled with the at least one antenna;
a controller operatively coupled with the AD converter;
a user interface operatively coupled with the controller;
a tangible, non-transitory memory configured to communicate with the controller, the tangible, non-transitory memory having instructions stored therein that, in response to execution by the controller, cause the controller to:
generate and send the RF signal to the AD converter;
command the antenna to send the RF signal and receive a micro-Doppler echo of the RF signal;
receive a digital form of the micro-Doppler echo from the AD converter;
extract from the digital form of the micro-Doppler echo each of: 1) a micro-Doppler spectra of at least one UAS, 2) a detection of the at least one UAS, 3) a radar cross section (RCS) of the at least one UAS, and 4) a radial speed of the at least one UAS; wherein the micro-Doppler spectra comprises a cycle associated with a model of the at least one UAS; wherein the cycle comprises a sequence of power up, max power, and power down;
compare each of the micro-Doppler spectra, the RCS and the radial speed of the at least one UAS to at least one signature stored within the non-transitory memory, the at least one signature includes each of the micro-Doppler spectra, the RCS and the radial speed;
identify the model of the at least one UAS based on the comparison; and
send a detection indication and an identification indication to the user interface.

2. The detection and identification of an Unmanned Aerial System of claim 1, wherein the coherent radar system is one of: a frequency modulated continuous wave perimeter surveillance radar and a pulsed Doppler aircraft weather radar.

3. The detection and identification of an Unmanned Aerial System of claim 1, wherein the frequency is at least one of: a weather radar frequency of approximately 9.4 GHz and a perimeter surveillance radar frequency of approximately 5.8 GHz.

4. The detection and identification of an Unmanned Aerial System of claim 1, wherein the waveform is at least one of: a pulse-Doppler waveform and a frequency modulated continuous wave waveform.

5. The detection and identification of an Unmanned Aerial System of claim 1, wherein the micro-Doppler spectra further comprises a rotor signature and a motor signature.

6. The detection and identification of an Unmanned Aerial System of claim 1, wherein the at least one signature further comprises one of: the micro-Doppler spectra, a pattern of radial velocity over time, the RCS, and the radial speed.

7. The detection and identification of an Unmanned Aerial System of claim 1, wherein compare the micro-Doppler spectra, the RCS and the radial speed of the at least one UAS to at least one signature stored within the non-transitory memory further comprises a storage of a newly detected signature within the non-transitory memory should the comparison result in a non-match.

8. The detection and identification of an Unmanned Aerial System of claim 1, wherein the tangible, non-transitory memory further includes a plurality of signatures representative of an associated plurality of UAS models.

9. The detection and identification of an Unmanned Aerial System of claim 1, wherein the detection indication further includes a range and an altitude of the at least one UAS.

10. The detection and identification of an Unmanned Aerial System of claim 1, wherein the user interface further comprises one of: at least one display viewable by a user, and a processor configured for countering a threat UAS.

11. A method for detection and identification of an Unmanned Aerial System (UAS), comprising:
generating and sending an RF signal;

receiving a micro-Doppler echo of the RF signal;

converting the micro-Doppler echo of the RF signal to a digital form of the micro-Doppler echo;

extracting from the digital form of the micro-Doppler echo each of: 1) a micro-Doppler spectra of at least one UAS, 2) a detection of the at least one UAS, 3) a radar cross section (RCS) of the at least one UAS, and 4) a radial speed of the at least one UAS; wherein the micro-Doppler spectra comprises a cycle associated with a model of the at least one UAS; wherein the cycle comprises a sequence of power up, max power, and power down;

comparing each of the micro-Doppler spectra, the RCS and the radial speed of the at least one UAS to at least one signature stored within a memory, the at least one signature includes each of the micro-Doppler spectra, the RCS and the radial speed;

identifying the model of the at least one UAS based on the comparison; and sending a detection indication and an identification indication to a user interface.

12. The method for detection and identification of an Unmanned Aerial System of claim 11, wherein extracting the micro-Doppler spectra of at least one UAS further comprises a Fourier transform analysis of a plurality of samples of the digital form of the micro-Doppler echo.

13. The method for detection and identification of an Unmanned Aerial System of claim 11, wherein extracting the micro-Doppler spectra of at least one UAS further comprises configuring a portion of the memory within one of an aircraft weather radar (WxR) system and a perimeter surveillance radar (PSR) system to configure the WxR and PSR systems for extracting the micro-Doppler spectra of at least one UAS and comparing the extracted a micro-Doppler spectra to the at least one signature stored within the memory.

14. The method for detection and identification of an Unmanned Aerial System of claim 11, comprising storing an unidentified micro-Doppler spectra to a new signature within a memory.

15. The method for detection and identification of an Unmanned Aerial System of claim 11, wherein the detection indication further includes a range and an altitude of the at least one UAS.

* * * * *